(12) United States Patent
Nishioka et al.

(10) Patent No.: US 7,355,979 B2
(45) Date of Patent: Apr. 8, 2008

(54) COMMUNICATION NETWORK, PATH SETTING METHOD, NETWORK MANAGEMENT SYSTEM AND NODE

(75) Inventors: Itaru Nishioka, Tokyo (JP); Yoshihiko Suemura, Tokyo (JP)

(73) Assignee: NEC Corporation, Tokyo (JP)

( * ) Notice: Subject to any disclaimer, the term of this patent is extended or adjusted under 35 U.S.C. 154(b) by 1127 days.

(21) Appl. No.: 10/211,332

(22) Filed: Aug. 5, 2002

(65) Prior Publication Data

US 2003/0026210 A1    Feb. 6, 2003

(30) Foreign Application Priority Data

Aug. 6, 2001  (JP) .............................. 2001-237325

(51) Int. Cl.
*H04L 12/26* (2006.01)
*H04L 12/28* (2006.01)

(52) U.S. Cl. ..................... 370/238; 370/395.2; 370/406

(58) Field of Classification Search ........ 370/389–397, 370/216–228, 238, 252
See application file for complete search history.

(56) References Cited

U.S. PATENT DOCUMENTS 6,122,249 A * 9/2000 Mochizuki et al. ......... 370/220
6,201,788 B1 * 3/2001 Ishiwatari .................. 370/228

FOREIGN PATENT DOCUMENTS

JP   2000-295220 A   10/2000
JP   2000-295221 A   10/2000

OTHER PUBLICATIONS

P. Ashwood-Smith et al., "Generalized MPLS—Signaling Functional Description", draft-ietf-mpls-generalized-signaling-04.txt Internet Draft, May 2001, 28 pages.
Y. Suemura et al., "Control of Hierarchial Paths in an Optical Network," PNI2000-38, The Institute of Electronics, Information and Communication Engineers. Mar. 2001, pp. 45-50.

* cited by examiner

*Primary Examiner*—Steven Nguyen
(74) *Attorney, Agent, or Firm*—Foley & Lardner LLP

(57) ABSTRACT

A hierarchized path setting system in a communication network efficiently contains lower order paths in higher order path. The communication network has a plurality of nodes capable to perform switching process and demultiplexing process not only for lower order paths in a predetermined hierarchical level among hierarchized paths but also for higher order paths in a hierarchical level higher than the predetermined hierarchical level, and a plurality of links connecting these nodes. The system is responsive to a new path setting demand for setting the lower order path, for setting the lower order path in the higher order path when a single higher order path is set from a predetermined transmiter node group, in which a transmitter node of the lower order path belongs, to a predetermined receiver node group including a receiver node.

47 Claims, 13 Drawing Sheets

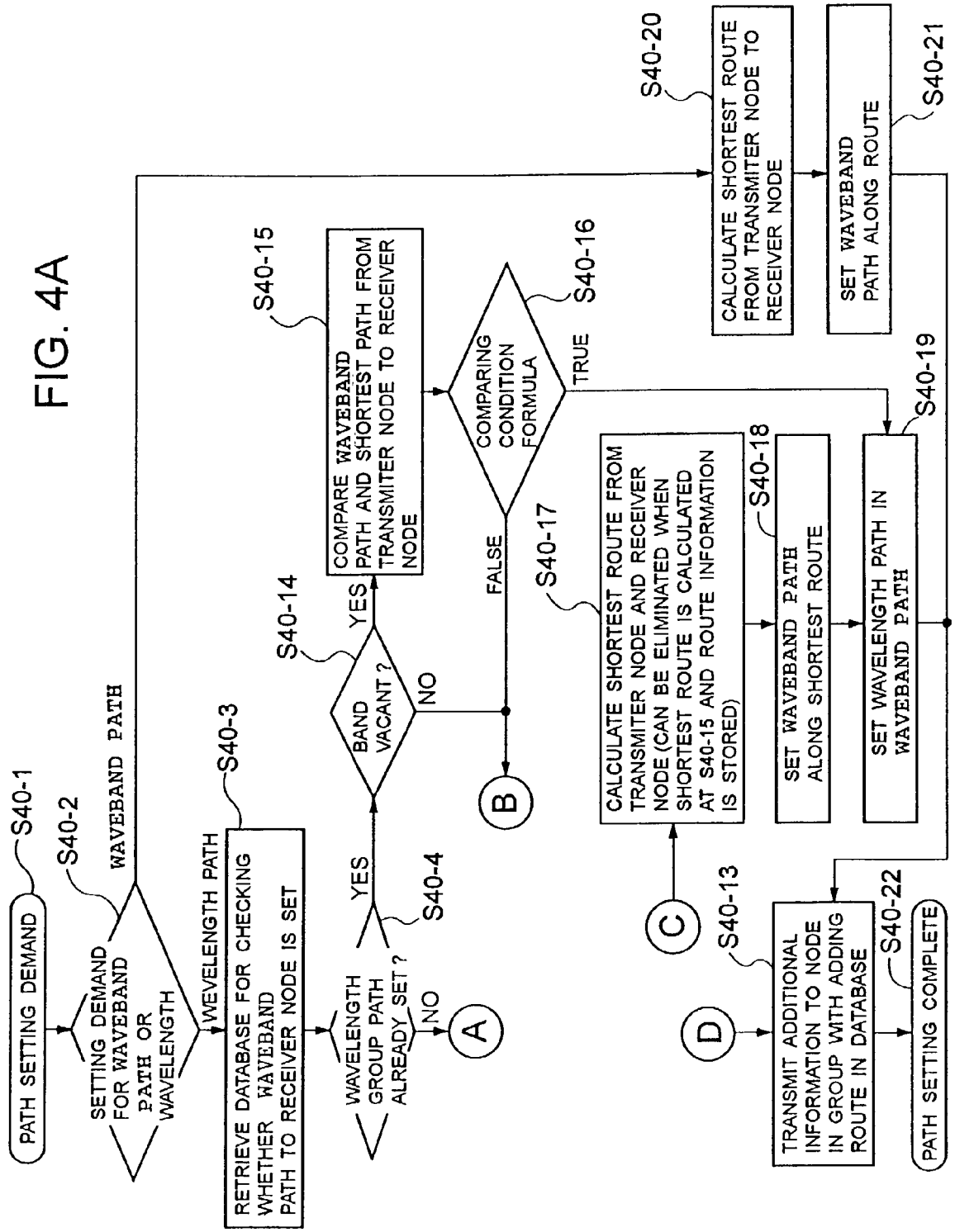

COMMUNICATION NETWORK, PATH SETTING METHOD, NETWORK MANAGEMENT SYSTEM AND NODE

BACKGROUND OF THE INVENTION

1. Field of the Invention

The present invention relates generally to a communication network, a path setting method, a network management system and a node. More particularly, the invention relates to a hierarchical path setting system in a communication network, in which paths having mutually different granularities are present in admixing manner.

2. Description of the Related Art

Currently, in communication network, attempt is made for establishing paths having variety of granularities. For example, in an internet draft "draft-ietf-mpls-generalized-signaling-04.txt" (reference 1) of IETF (Internet Engineering Task Force), there has been proposed to establish ATM (asynchronous Transfer Mode) path, VP/VC (Virtual Pass/Virtual Channel) path, SONET (Synchronous Optical Network)/SDH (Synchronous Digital Hierarchy) path, wavelength/waveband path, fiber path and so forth.

In the network containing a plurality of paths having mutually different granularities, the paths have conventionally been hierarchized per granularities, lower order paths aggregated per sub-networks are set via higher order paths. Here, the lower order path represents a path having smaller granularity, and the higher order path represents a path having greater granularity.

It becomes possible to switch, the paths having smaller granularity set in the same route with the paths of greater granularity in multiplexing manner by hierarchizing the paths to permit advantageously reduce a size of cross connect. On the other hand, the user may demand setting of paths of variety of granularities, such as 155 Mbit/s, . . . 2. g Gbit/s, 10 Gbit/s and so forth, adapting to application.

The network having hierarchical has been disclosed in Suemura et al., "Control of Hierarchical Paths in Optical Network", PNI2000-37, the Institute of Electronics Information and Communication Engineers, Japan, (reference 2), for example.

As one prior art, general network construction shown in the reference 1 is illustrated in FIG. 12. The network consisted of optical network devices 102-1 to 102-16 having wavelength path is divided into a plurality of sub-networks 100-1 to 100-4 depending upon geographical information, convenience in management or the like. These plurality of sub-networks are connected to by optical network devices 101-1 to 101-6 handling waveband path, one or more of which is provided in each sub-network. As set forth above, the network handling the wavelength paths and the network handling the waveband path are hierarchized.

In such network, the optical paths are classified to paths set in the sub-network and paths set bridging sub-net works. Paths set from the optical network devices 102-9 to 102-12 are established only by wavelength paths in the sub-network via the optical network device 102-11. On the other hand, the path set from the optical network device 102-1 to 102-16 is established by the wavelength paths in the sub-network and the waveband paths between the sub-networks via the optical network devices 102-2, 101-1, 101-5, 101-3 and 102-14.

The reference 2 as the second prior art also discloses setting of hierarchized path without dividing the network into sub-networks. Amongst, all nodes forming the network have construction for switching the wavelength paths and the waveband paths. In such network, when a setting demand of the wavelength path is given, a method deriving the shortest route to a receiver node by using CSPF (Constraint Shortest Path Fast) algorithm which calculates a routing path in consideration of only links having vacant wavelength and setting the wavelength paths along the calculated path, is repeated. When a number of the wavelength paths along certain route reaches a number to form the waveband path, aggregate of the wavelength paths is switched into the waveband path. In the foregoing procedure, hierarchized path is established by the wavelength paths and the waveband paths.

A first problem encountered in the first prior art is to waste network resource upon occurrence of demand not matching with traffic patterns used in designing since the sub-networks are preliminarily designed in fixed manner. For example, when one demand for lower order path between the sub-networks is present, remaining bands are wasted within the higher order path connecting between the sub-networks.

A second problem encountered in the first prior art is that failure of the node handling the higher order paths influences for all of the networks. Since the sub-networks are preliminarily designed in fixed manner, the nodes handling the higher order paths are determined in similar manner. Therefore, when failure is caused in the node handling the higher order paths, the path bridging between the sub-networks cannot be set since the higher order path cannot be set.

A problem in the second prior art is incapability of efficiently multiplexing the lower order paths into the higher order path. While the second prior art can solve the second problem in the first prior art, it is not possible to intentionally aggregate lower order paths in the same route to switch into the higher order path. As a result, since the higher order path cannot be established efficiently, advantage of hierarchizing of the path can be degraded.

SUMMARY OF THE INVENTION

It is an object of the present invention to provide a hierarchized path setting system in a communication network to efficiently contain lower order paths in higher order path.

According to the first aspect of the present invention, a communication network comprises:

a plurality of nodes capable to perform switching process and demultiplexing process not only for lower order paths in a predetermined hierarchical level among hierarchized paths but also for higher order paths in a hierarchical level higher than the predetermined hierarchical level;

a plurality of links connecting these nodes; and path setting control means responsive to a new path setting demand for setting the lower order path, for setting the lower order path in the higher order path when a single higher order path is set from a predetermined transmiter node group, in which a transmiter node of the lower order path belongs, to a predetermined receiver node group including a receiver node.

According to the second aspect of the present invention, a communication network comprises:

a plurality of nodes capable to perform switching process and demultiplexing process not only for lower order paths in a predetermined hierarchical level among hierarchized paths but also for higher order paths in a hierarchical level higher than the predetermined hierarchical level;

a plurality of links connecting these nodes; and path setting control means responsive to a new path setting demand for setting the lower order path, the path setting control means setting the higher order path between the transmiter node group consisted of nodes reachable from the transmiter node via the higher order path and the receiver node when the single higher order path is not set between the transmiter node of the lower order path and the receiver node, and setting the lower order path via the set higher order path and the node containing in the transmiter node group.

According to the third aspect of the present invention, a communication network comprises:

a plurality of nodes capable to perform switching process and demultiplexing process not only for lower order paths in a predetermined hierarchical level among hierarchized paths but also for higher order paths in a hierarchical level higher than the predetermined hierarchical level;

a plurality of links connecting these nodes; and path setting control means responsive to a new path setting demand for setting the lower order path, the path setting control means setting the higher order path between the transmiter node group consisted of the nodes reachable from the transmiter node via the higher order path and the receiver node group consisted of the nodes reachable from the receiver node when the single higher order path is not set between the transmiter node of the lower order path and the receiver node, and setting the lower order path via the set higher order path and the node containing in the transmiter node group and the receiver node group.

According to the fourth aspect of the present invention, a communication network comprises:

a plurality of nodes capable to perform switching process and demultiplexing process not only for lower order paths in a predetermined hierarchical level among hierarchized paths but also for higher order paths in a hierarchical level higher than the predetermined hierarchical level;

a plurality of links connecting these nodes; and path setting control means responsive to a new path setting demand for setting the lower order path, the path setting control means setting the higher order path between the transmiter node and the receiver node group consisted of the nodes reachable from the receiver node when the single higher order path is not set between the transmiter node of the lower order path and the receiver node, and setting the lower order path via the set higher order path and the node containing in the receiver node group.

According to the fifth aspect of the present invention, a path setting method in a communication network comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the path setting method comprises:

path setting control step, responsive to a new path setting demand for setting the lower order path, of setting the lower order path in the higher order path when a single higher order path is set from a predetermined transmiter node group, in which a transmiter node of the lower order path belongs, to a predetermined receiver node group including a receiver node.

According to the sixth aspect of the present invention, a path setting method in a communication system comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the path setting method comprises:

path setting control step to be activated in responsive to a new path setting demand for setting the lower order path, in the path setting control step, the higher order path being set between the transmiter node group consisted of nodes reachable from the transmiter node via the higher order path and the receiver node when the single higher order path is not set between the transmiter node of the lower order path and the receiver node, and the lower order path being set via the set higher order path and the node containing in the transmiter node group.

According to the seventh aspect of the present invention, a path setting method in a communication system comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the path setting method comprises:

path setting control step to be activated in responsive to a new path setting demand for setting the lower order path, in the path setting control step, in the path setting control step, the higher order path being set between the transmiter node group consisted of the nodes reachable from the transmiter node via the higher order path and the receiver node group consisted of the nodes reachable from the receiver node when the single higher order path is not set between the transmiter node of the lower order path and the receiver node, and the lower order path being set via the set higher order path and the node containing in the transmiter node group and the receiver node group.

According to the eighth aspect of the present invention, a path setting method in a communication system comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the path setting method comprises:

path setting control step to be activated in responsive to a new path setting demand for setting the lower order path, in the path setting control step, in the path setting control step, the higher order path being set between the transmiter node and the receiver node group consisted of the nodes reachable from the receiver node when the single higher order path is not set between the transmiter node of the lower order path and the receiver node, and the lower order path being set via the set higher order path and the node containing in the receiver node group.

According to the ninth aspect of the present invention, a node comprises:

a switch for switching not only lower order paths in a predetermined hierarchical level among hierarchized paths but also higher order paths in a hierarchical level higher than the predetermined hierarchical level;

multiplexing means for multiplexing a plurality of the lower order paths in the higher order path;

demultiplexing means for demultiplexing the higher order path into the lower order paths; and path setting control means responsive to a new path setting demand for setting the lower order path containing own node as a transmitter node, for setting the lower order path in the higher order path when a single higher order path is set from a predetermined transmitter node group, in which a transmitter node of the lower order path belongs, to a predetermined receiver node group including a receiver node.

According to the tenth aspect of the present invention, a node comprises:

a switch for switching not only lower order paths in a predetermined hierarchical level among hierarchized paths but also higher order paths in a hierarchical level higher than the predetermined hierarchical level;

multiplexing means for multiplexing a plurality of the lower order paths in the higher order path;

demultiplexing means for demultiplexing the higher order path into the lower order paths; and path setting control means responsive to a new path setting demand for setting the lower order path, the path setting control means setting the higher order path between the transmiter node group consisted of nodes reachable from the transmiter node via the higher order path and the receiver node when the single higher order path is not set between the transmiter node of the lower order path and the receiver node, and setting the lower order path via the set higher order path and the node containing in the transmiter node group.

According to the eleventh aspect of the present invention, a node comprises:

a switch for switching not only lower order paths in a predetermined hierarchical level among hierarchized paths but also higher order paths in a hierarchical level higher than the predetermined hierarchical level;

multiplexing means for multiplexing a plurality of the lower order paths in the higher order path;

demultiplexing means for demultiplexing the higher order path into the lower order paths; and path setting control means responsive to a new path setting demand for setting the lower order path, the path setting control means setting the higher order path between the transmiter node group consisted of the nodes reachable from the transmiter node via the higher order path and the receiver node group consisted of the nodes reachable from the receiver node when the single higher order path is not set between the transmiter node of the lower order path and the receiver node, and setting the lower order path via the set higher order path and the node containing in the transmiter node group and the receiver node group.

According to the twelfth aspect of the present invention, a node comprises:

a switch for switching not only lower order paths in a predetermined hierarchical level among hierarchized paths but also higher order paths in a hierarchical level higher than the predetermined hierarchical level;

multiplexing means for multiplexing a plurality of the lower order paths in the higher order path;

demultiplexing means for demultiplexing the higher order path into the lower order paths; and path setting control means responsive to a new path setting demand for setting the lower order path, the path setting control means setting the higher order path between the transmiter node and the receiver node group consisted of the nodes reachable from the receiver node when the single higher order path is not set between the transmiter node of the lower order path and the receiver node, and setting the lower order path via the set higher order path and the node containing in the receiver node group.

According to the thirteenth aspect of the present invention, a network management system in a communication network including a plurality of nodes capable to perform switching process and demultiplexing process not only for lower order paths in a predetermined hierarchical level among hierarchized paths but also for higher order paths in a hierarchical level higher than the predetermined hierarchical level, and a plurality of links connecting these nodes;

the network management system comprises:

path setting control means responsive to a new path setting demand for setting the lower order path, for setting the lower order path in the higher order path when a single higher order path is set from a predetermined transmiter node group, in which a transmiter node of the lower order path belongs, to a predetermined receiver node group including a receiver node.

According to the fourteenth aspect of the present invention, a network management system in a communication network including a plurality of nodes capable to perform switching process and demultiplexing process not only for lower order paths in a predetermined hierarchical level among hierarchized paths but also for higher order paths in a hierarchical level higher than the predetermined hierarchical level, and a plurality of links connecting these nodes;

the network management system comprises:

path setting control means responsive to a new path setting demand for setting the lower order path, the path setting control means setting the higher order path between the transmiter node group consisted of nodes reachable from the transmiter node via the higher order path and the receiver node when the single higher order path is not set between the transmiter node of the lower order path and the receiver node, and setting the lower order path via the set higher order path and the node containing in the transmiter node group.

According to the fifteenth aspect of the present invention, a network management system in a communication network including a plurality of nodes capable to perform switching process and demultiplexing process not only for lower order paths in a predetermined hierarchical level among hierarchized paths but also for higher order paths in a hierarchical level higher than the predetermined hierarchical level, and a plurality of links connecting these nodes;

the network management system comprises:

path setting control means responsive to a new path setting demand for setting the lower order path, the path setting control means setting the higher order path between the transmiter node group consisted of the nodes reachable from the transmiter node via the higher order path and the receiver node group consisted of the nodes reachable from the receiver node when the single higher order path is not set between the transmiter node of the lower order path and the receiver node, and setting the lower order path via the set higher order path and the node containing in the transmiter node group and the receiver node group.

According to the sixteenth aspect of the present invention, a network management system in a communication network including a plurality of nodes capable to perform switching process and demultiplexing process not only for lower order paths in a predetermined hierarchical level among hierarchized paths but also for higher order paths in a hierarchical level higher than the predetermined hierarchical level, and a plurality of links connecting these nodes;

the network management system comprises:

path setting control means responsive to a new path setting demand for setting the lower order path, the path setting control means setting the higher order path between the transmiter node and the receiver node group consisted of the nodes reachable from the receiver node when the single higher order path is not set between the transmiter node of the lower order path and the receiver node, and setting the lower order path via the set higher order path and the node containing in the receiver node group.

According to the seventeenth aspect of the present invention, a storage medium storing a program to be executed by a computer for path setting control in a communication network comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the program comprises:

path setting control step, responsive to a new path setting demand for setting the lower order path, of setting the lower order path in the higher order path when a single higher order path is set from a predetermined transmiter node group, in which a transmiter node of the lower order path belongs, to a predetermined receiver node group including a receiver node.

According to the eighteenth aspect of the present invention, a storage medium storing a program to be executed by a computer for path setting control in a communication network comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the program comprises:

path setting control step to be activated in responsive to a new path setting demand for setting the lower order path, in the path setting control step, the higher order path being set between the transmiter node group consisted of nodes reachable from the transmiter node via the higher order path and the receiver node when the single higher order path is not set between the transmiter node of the lower order path and the receiver node, and the lower order path being set via the set higher order path and the node containing in the transmiter node group.

According to the nineteenth aspect of the present invention, a storage medium storing a program to be executed by a computer for path setting control in a communication network comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the program comprises:

path setting control step to be activated in responsive to a new path setting demand for setting the lower order path, in the path setting control step, in the path setting control step, the higher order path being set between the transmiter node group consisted of the nodes reachable from the transmiter node via the higher order path and the receiver node group consisted of the nodes reachable from the receiver node when the single higher order path is not set between the transmiter node of the lower order path and the receiver node, and the lower order path being set via the set higher order path and the node containing in the transmiter node group and the receiver node group.

According to the twentieth aspect of the present invention, a storage medium storing a program to be executed by a computer for path setting control in a communication network comprising:

a plurality of nodes capable to perform switching process and demultiplexing process not only for lower order paths in a predetermined hierarchical level among hierarchized paths but also for higher order paths in a hierarchical level higher than the predetermined hierarchical level; and a plurality of links connecting these nodes;

the program comprises:

path setting control step to be activated in responsive to a new path setting demand for setting the lower order path, in the path setting control step, in the path setting control step, the higher order path being set between the transmiter node and the receiver node group consisted of the nodes reachable from the receiver node when the single higher order path is not set between the transmiter node of the lower order path and the receiver node, and the lower order path being set via the set higher order path and the node containing in the receiver node group.

According to the twenty-first aspect of the present invention, a communication network comprises:

a plurality of nodes capable to perform switching process and demultiplexing process not only for lower order paths in a predetermined hierarchical level among hierarchized paths but also for higher order paths in a hierarchical level higher than the predetermined hierarchical level;

a plurality of links connecting these nodes;

a group being preliminarily established within a predetermined value of hop numbers from each of the plurality of nodes;

setting information of the higher order path being stored in the each node; and the setting information being exchanged within the group for making the setting information stored in respective nodes in the group consistent with each other in the group.

In summary, a first path setting system according to the present invention checks whether the higher order path is set from the group formed by the transmiter node to the group formed by the receiver node when the new lower order path is to be set. When the higher order path is already set, the new lower order path is set in the higher order path. By this, lower order paths established in the group is aggregated to the higher order path to effectively use the vacant bands in the higher order path.

In a second path setting system according to the present invention, when the lower order path is newly set, the higher order path is newly set between the group consisted of nodes, to which the transmiter node can reach via the higher order path and the group consisted of nodes, to which the receiver node can reach via the higher order path. The lower order path is set via the node in the group and the newly set higher order path. Thus, since the already set higher order path from the transmiter node is effectively used, the vacant band in the higher order path can be effectively used.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIGS. 4A and 4B are flowcharts for setting hierarchized path in the first and second embodiments of the present invention;

DESCRIPTION OF THE PREFERRED EMBODIMENT

The present invention will be discussed hereinafter in detail in terms of the preferred embodiments of the present invention with reference to the accompanying drawings. In the following description, numerous specific details are set forth in order to provide a thorough understanding of the present invention.

Figure 1:
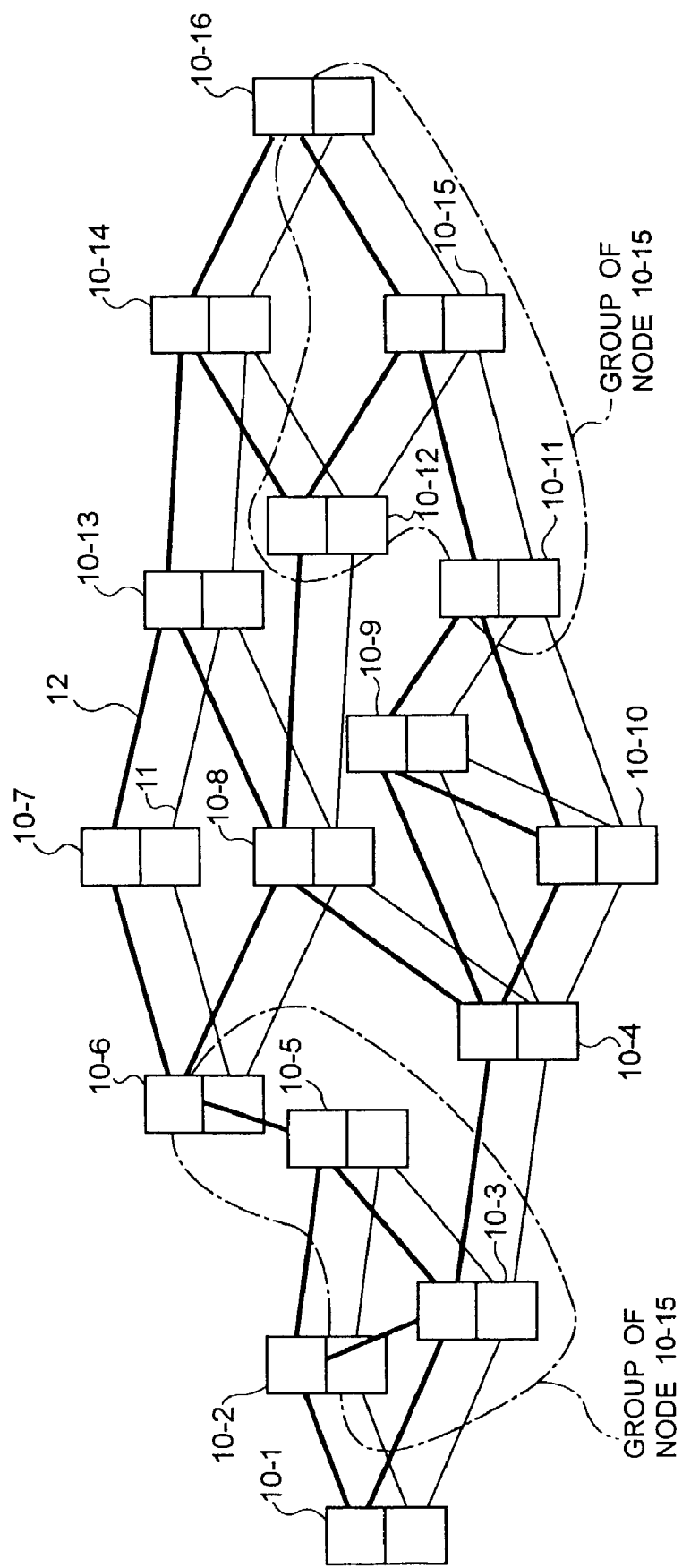
FIG. 1 is a block diagram showing a construction of the first embodiment of distributingly controlled network according to the present invention.
Figure 2:
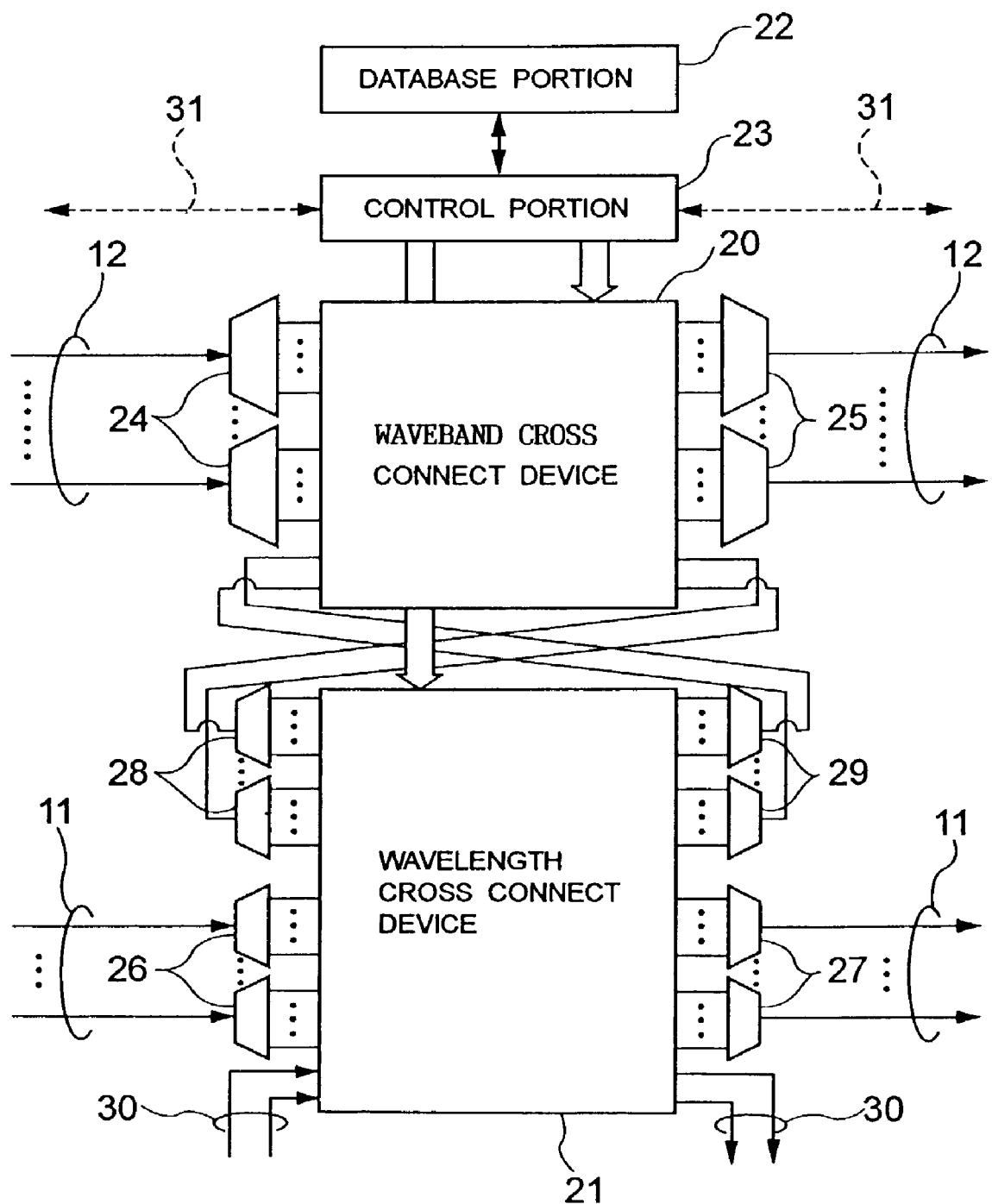
FIG. 2 is a block diagram showing an internal construction of a node device in the first embodiment of the present invention.

FIGS. 1 and 2 are block diagrams showing a network construction and a node in the first embodiment of the present invention. In FIG. 1, a communication network according to the present invention includes optical network devices (hereinafter referred to as node) 10-1 to 10-16. Each of these nodes has a construction shown in FIG. 2 and has a function for switching both of a wavelength path and a waveband path as hierarchized path. Each node also has a function for multiplexing wavelength paths into waveband path and demultiplexing the waveband path into wavelength paths. Wavelength links 11 and wavelength group links 12 are constructed with a plurality of optical fibers.

In FIG. 2, each of the nodes 10-1 to 10-16 includes a wavelength group cross connect device 20, a wavelength cross connect device 21, a database 22, a control portion 23 controlling the wavelength group cross connect device 20 and the wavelength cross connect device 21, demultiplexers 24 and multiplexers 25 for waveband paths, demultiplexers 26 and multiplexers 27 for waveband paths, demultiplexers 28 converting the waveband path into wavelength paths and multiplexers 29 converting the wavelength paths into waveband path.

Each node is connected with adjacent node with the wavelength links 11, the wavelength group links 12 and a control channel 31 exchanging a control signal. On the other hand, the node is connected to not shown client devices through links 30.

Figure 4B:
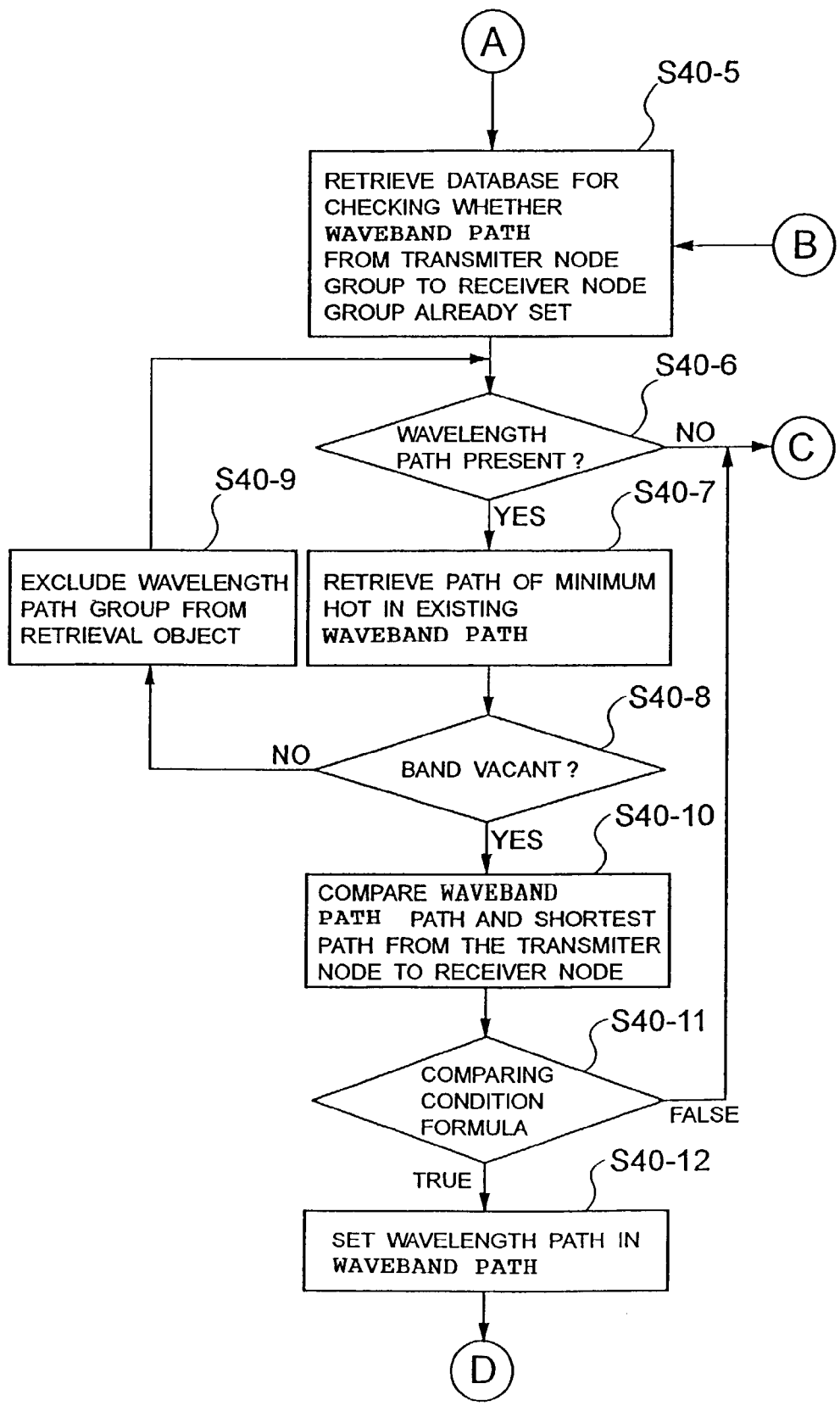
Figure 5:
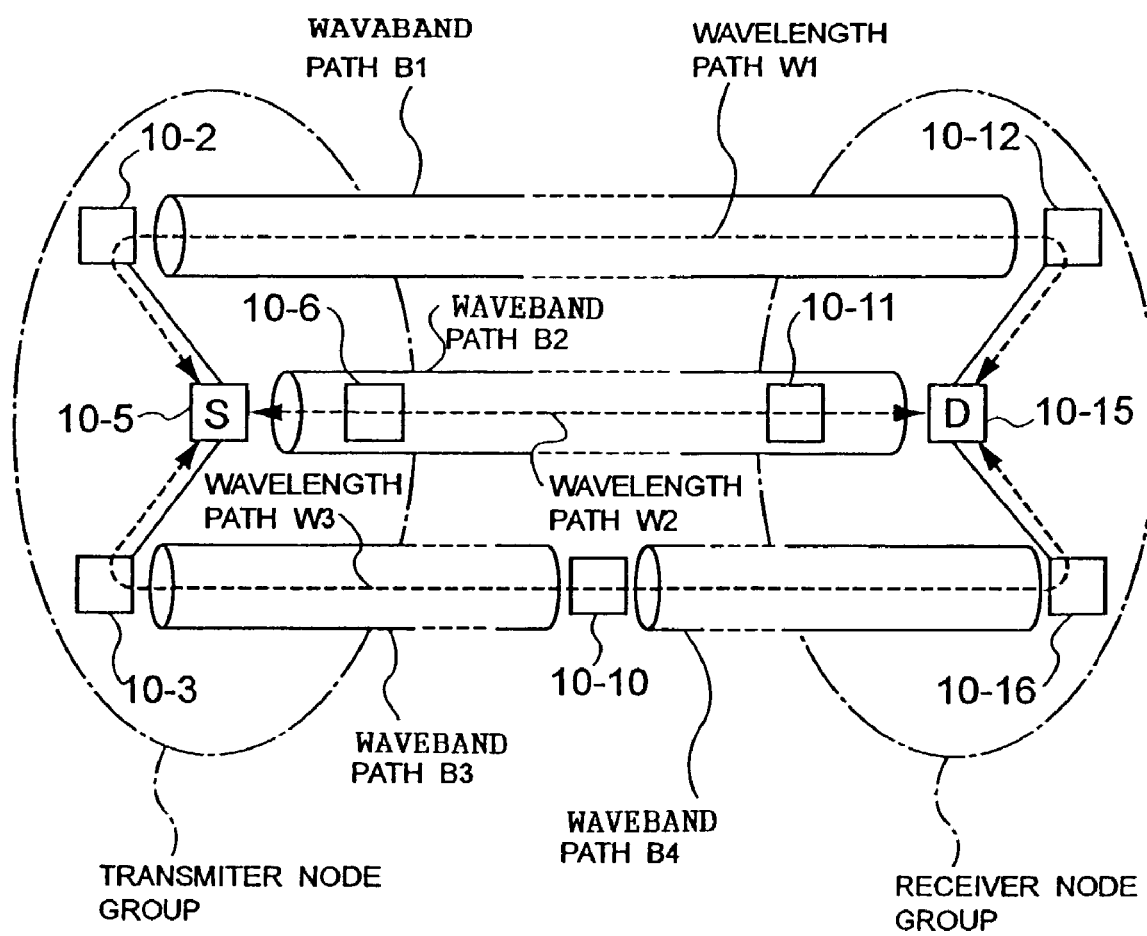
FIG. 5 is a block diagram showing a condition of path set in the first and second embodiments of the present invention.

Hereinafter, the embodiments of the present invention will be discussed in connection with the network having construction set forth above in terms of the case where aggregate of wavelengths N into one wavelength group. FIGS. 4A, 4B and 5 are flowchart and block diagram showing the first embodiment of the present invention. The first embodiment of the present invention is a system setting the wavelength paths in the waveband paths set between a transmitter node group consisted of the nodes located within H (H is one of natural numbers) hops from a transmitter node and a receiver node group consisted of the nodes located within H hops from a receiver node. Here, the nodes within H hops represents the nodes to be reached via less than or equal to H of physically connected links.

At first, discussion will be given hereinafter with respect to a path setting information exchanging system within a group formed by the transmitter node and the receiver node, In the first embodiment of the present invention, each node 10-1 to 10-16 form a group consisted of respective nodes physically connected to own node and located adjacent H hops of distance from the own node. In the present invention, a group of the transmitter node will be referred to as the transmitter node group and a group of the receiver node will be referred to as the receiver node group. For example, when the nodes located within adjacent one hop (H-1) are assumed to form a group, groups of the nodes 10-5 and 10-15 are respectively consisted of the nodes 10-2, 10-3, 10-6 and 10-11, 10-12, 10-16, as shown in FIG. 1. On the other hand, in different viewpoint, the node 10-5 belongs in a group of the node 10-2, a group of the node 10-3, and a group of the node 10-6. The node 10-15 belongs in a group of the node 10-11, a group of the node 10-12, and a group of the node 10-16.

Figure 3:
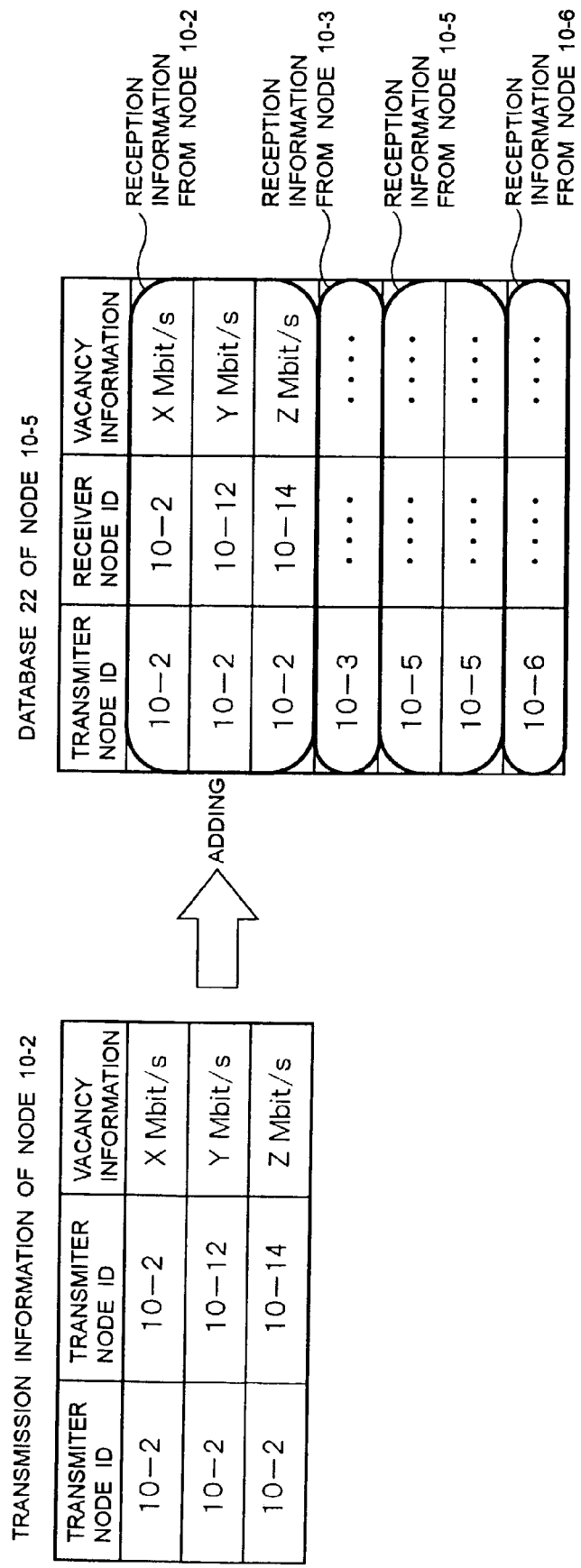
FIG. 3 is a block diagram showing information exchanged between nodes and information stored in a database employed in the first embodiment.

Each node has to store path setting information relating to the waveband paths already set by the nodes contained in, the group of the own node, in a database 22. This path setting information includes an ID (identification information) of a transmitter node, ID of a receiver node of the waveband path already set by own node, and a vacant information of the waveband path and is exchanged by distributing the waveband path setting information, in which the ID of the transmitter node is the ID of own node, to respective nodes in the own group through the control channel 31. For example, when the node 10-2 contained in the group of the node 10-5 sets the waveband path to the nodes 10-7, 10-12 and 10-14, the node 10-2 stores the path setting information shown on left side in FIG. 3, in own database 22. Among information of the database 22, the waveband path information, in which the ID of the transmitter node is the ID of own node (node 10-2) is transmitted each node (including the node 10-5) belonging in the group of the own node. Each node (including the node 10-5) receiving the waveband path setting information of the node 10-2 updates the own database 22. By transmitting the wavelength group setting information, in which the transmitter node ID is the ID of the own node, among information stored in the own database 22 in similar manner from all of other nodes (node 10-3, node 10-6) contained within the group of the node 10-5, to the nodes belonging in respective groups of their own nodes, the path setting information can be exchanged between all of nodes belonging in the group of the node 10-5. Thus, the database of the node 10-5 may store the waveband path setting information, in which each node contained in the group of the node 10-5 becomes the transmitter node as shown in the right side in FIG. 3.

The path setting information is distributed regularly or at every occasion of setting new path using a routing function, such as OSPF (Open Shortest Path Fast) or so forth, or a signaling function. When the routing function is used, a value "H" corresponding to number of hops, is set in a live field of each packet carrying the path setting information. The value of the live field is decremented by "1" at every one hop of transmission to transmit the packet to the adjacent node until the value of the live field becomes "0". The node receiving the packet having the live filed "0" disposes the packet By repeating the foregoing procedure, the path setting information can be distributed to all of the nodes in the own group.

On the other hand, when the signaling function is used, since each node is preliminarily known a topology information of the network, the node transmitting the path setting information performs distribution of the path setting information by transmitting the path setting information to the nodes belonging in the own group.

Next, a path setting procedure in the case where a wavelength path setting demand for setting the wavelength path from the node 10-5 to the node 10-15 occurs, will be discussed using a flowchart of FIGS. 4A and 4B with reference to FIG. 5. The node 10-5 receiving a path setting demand (S40-1) from a client device or the like makes judgment whether the path setting demand requires establishment of the waveband path or the wavelength path. If the path setting demand requires establishment of the waveband path, the shortest route from the transmitter node to the receiver node is calculated by CSPF algorithm using only link having vacant band (S40-20) for setting the waveband path B2 along the route (S40-21).

It should be noted that the setting procedure of the path is to transmit the path setting demand from the transmitter node to the receiver node per one hop. Each node receiving this demand switches the wavelength group cross connect device 20 of the own node. When this setting demand arrives the receiver node, a response signal is transmitted from the receiver node to the transmitter node per one hop to verify whether the wavelength group cross connect device 20 is set correctly. Hereinafter, in the setting of the path, the foregoing operation is also applied to a wavelength group cross connect device or a wavelength cross connect device.

When the demand is for wavelength path, retrieval is performed against the database 22 for checking whether the path can be reached to the receiver node through one waveband path already set from the transmitter node to the receiver node (S40-3) When one waveband path B2 is already set (S40-4) and if a vacant band for setting the wavelength path is present in the waveband path B2 (S40-14), a route of the wavelength paths in the set waveband path B2 and the shortest route (route having physically the shortest length) from the transmitter node to the receiver node calculated by the CSPF algorithm using only links having vacant bands are compared (S40-15). Comparing condition formula "true" (S40-16), a wavelength path W2 in the waveband path B2 is set (S40-19). As the comparing condition formula, there is formula expressed by hop number of the retrieved route ≦hop number of the shortest route+(K is arbitrary natural number) or so forth.

At step S40-4, the waveband path is not set, or at step S40-16, the comparing condition formula is "false", retrieval is performed against the database for checking whether the waveband path is set between the transmitter node group and the receiver node group (S40-5). If the waveband path set forth above is not connected between the groups, the shortest route from the transmitter node to the receiver node is calculated using only links having vacant bands by the CSPF algorithm (S40-17) (calculation can be eliminated when the shortest route is already calculated at step S40-15 and the route information is stored) to set a single waveband path B2 along the shortest route (S40-18) and set a wavelength path W2 in the single waveband path B2 (S40-19). Here, the wavelength path can be set simultaneously with the waveband path by switching the wavelength cross connect in conjunction with switching of the wavelength group cross connect at each node.

At step S40-6, if the waveband path (B1 of FIG. 5) between the groups is set, the waveband path, in which the route of the wavelength paths connecting the transmiter node and the receiver node becomes the shortest as a result of routing through the waveband path (S40-7), is retrieved. Then, check is performed against the database 22 whether there is a vacant band to set the wavelength path in the retrieved waveband path (S40-8). If the vacant band is not available, the waveband path is eliminated from retrieving object (S40-9), the process returns to step S40-6. As a result of retrieval at step S40-8, when the band is vacant, the shortest route from the transmitter node to the receiver node calculated using only links having vacant bands by the CSPF algorithm and the retrieved route are compared under the comparing condition formula (S40-11). If the comparing condition formula is "false", the process is advanced to step S40-15, and if the comparing condition formula is "true", the wavelength path W1 is set in the waveband path (S40-13). As the comparing condition formula, there is formula expressed by hop number of the retrieved route≦hop number of the shortest route+(K is arbitrary natural number) or so forth.

As set forth above, after setting the wavelength path or the waveband path (S40-12, S40-18, S40-19, S40-21), the nodes at respective end points of the waveband path and the wavelength path add the path setting information in the database 22 and transmit the updated path setting information to each node in the group using the foregoing path setting information exchanging procedure (S40-13). The node receiving the path setting information updates information in the database 22.

By repeatedly performing the path setting method set forth above between the transmitter node and the receiver node to be set, the wavelength path can be efficiently aggregated without dividing the network into sub-networks. On the other hand, in the shown embodiment, since each node is not required to know the path setting information of the overall network, a traffic amount for transmitting the path setting information to each node can be reduced.

As the second embodiment of the present invention, discussion will be given for the case where each node stores the node information which can be reached via the waveband path with reference to FIG. 5. Points different from the first embodiment of the present invention, is capability of setting of the wavelength paths via the waveband paths between groups by knowing information of nodes which the nodes in the group can be reached through the waveband path (reachable node information).

At first, discussion will be given for exchanging system of the reachable node information for exchanging node information representative of nodes which can be reached by each node through the waveband path. The reachable node information is updated regularly or at every occurrence of setting of new path using the routing function. Each node distributes the setting information of the waveband path set by own node to all end point nodes set the waveband paths from the own node. The node receiving the path setting information adds the received information to the database 22 of own node, adds the path setting information of the waveband paths set by the own node to the received information to distribute the information to the all of the end point nodes to which the own node set the waveband paths. By repeating the foregoing operation, each node can obtain the node information reachable through a plurality of waveband paths.

Figure 6:
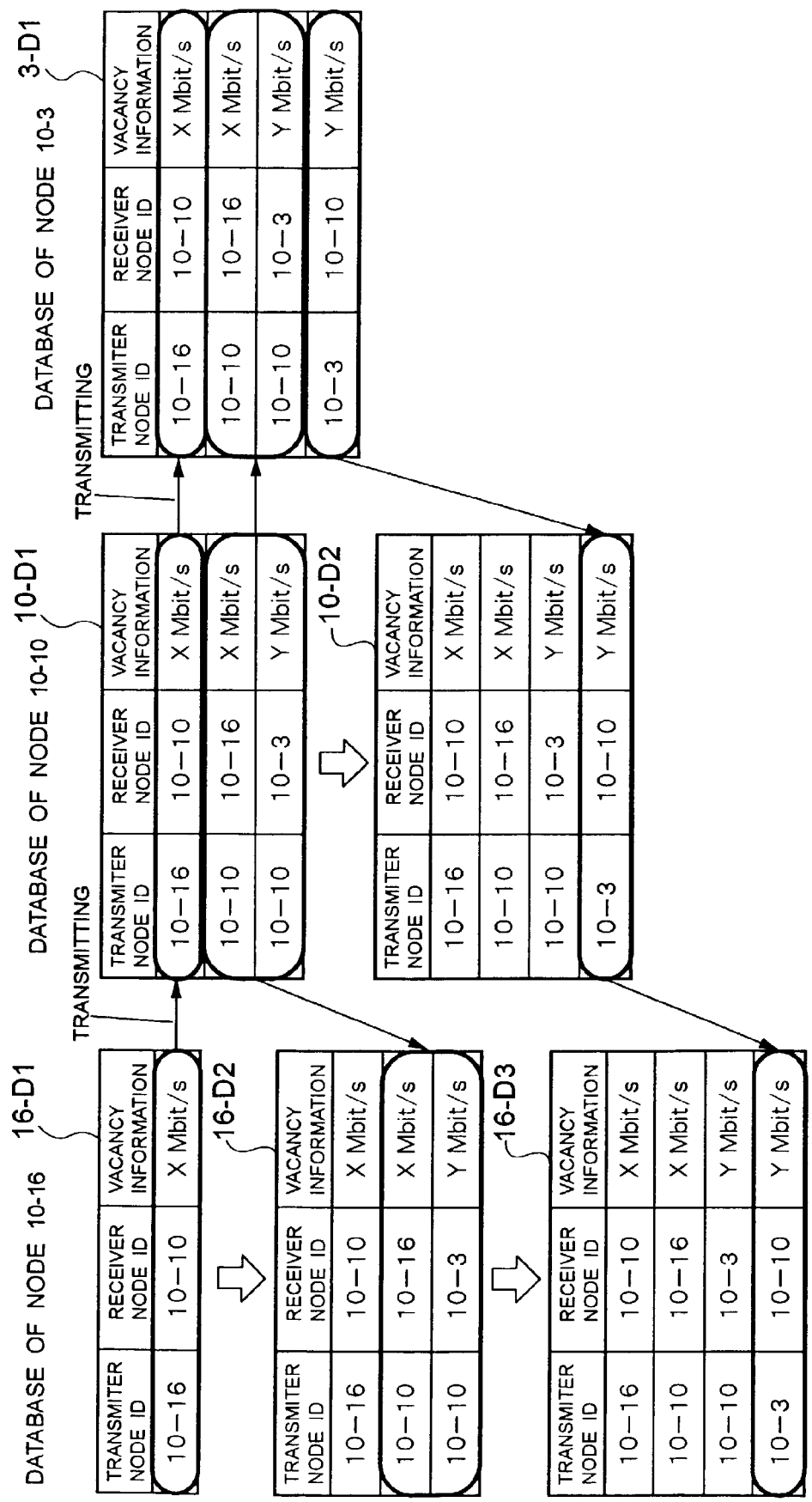
FIG. 6 is a block diagram showing exchanging of accessible information and a procedure.

For example, in FIG. 5, when the nodes 10-3 and 10-10, and the nodes 10-10 and 10-16 are respectively connected by two waveband paths B3 and B4, process of exchanging the information starting from the node 10-16 is shown in FIG. 6. In FIG. 6, the node 10-16 transmits the already set waveband path information 16-D1 to the node 10-10, to which the own node sets the waveband path. The node 10-10 receiving this information adds the received information time identifier the database of the own node, and in conjunction there with, transmits information 10-D1 to the nodes 10-3 and 10-16 to which the waveband paths are set. The node 10-3 receiving the information 10-D1 updates the database of own node to transmit information 3-D1 to the node 10-10. This operation is repeated until information in respective nodes becomes consistent with each other. As a result of exchanging of the reachable node information, it can be appreciated that the node 10-3 can reach the node 10-16 via the node 10-10. The reachable node information shown in FIG. 6 thus obtained is transmitted to other nodes from the node 10-3 in the transmitter node group in the foregoing procedure. On the other hand, the reachable node information is transmitted to other nodes in the receiver node group from the node 10-16.

Next, path setting method will be discussed for the case where each node stores the reachable node information in the database 22. While the path setting method is similar to that in the first embodiment of the present invention, it can be appreciated that the transmitter node 10-5 can reach the receiver node group via the node 10-10 from the transmitter node group by exchanging the path setting information within the group. As a result, at step S40-5 of FIG. 4, a route via a plurality of waveband paths is added to a list of the routes reachable to the receiver node group through a plurality of waveband paths. Subsequently, according to the procedure up to step S40-11, the route through a plurality of (two) waveband paths B3 and B4. Then, the wavelength W3 is set via the node 10-10.

Accordingly, even when the groups are connected via a plurality of waveband paths, the wavelength path can be set in the waveband path. In comparison with the first embodiment, the waveband path can be used more efficiently for setting the wavelength paths. Furthermore, the fixed sub-network can be regarded as group of each node. The first and second embodiments of the present invention is applicable even for the construction, in which the network disclosed in the prior art is divided into the sub-networks. In this case, the path information is exchanged between the nodes contained in each sub-network. The point different from the prior art is not to fixed the node to process the wavelength path to permit each node to process both of the higher order path and the lower order path. On the other hand, in the shown embodiment, since each node is not required to know the path setting information of the overall network, a traffic amount for transmitting the path setting information to each node can be reduced.

Figure 7:
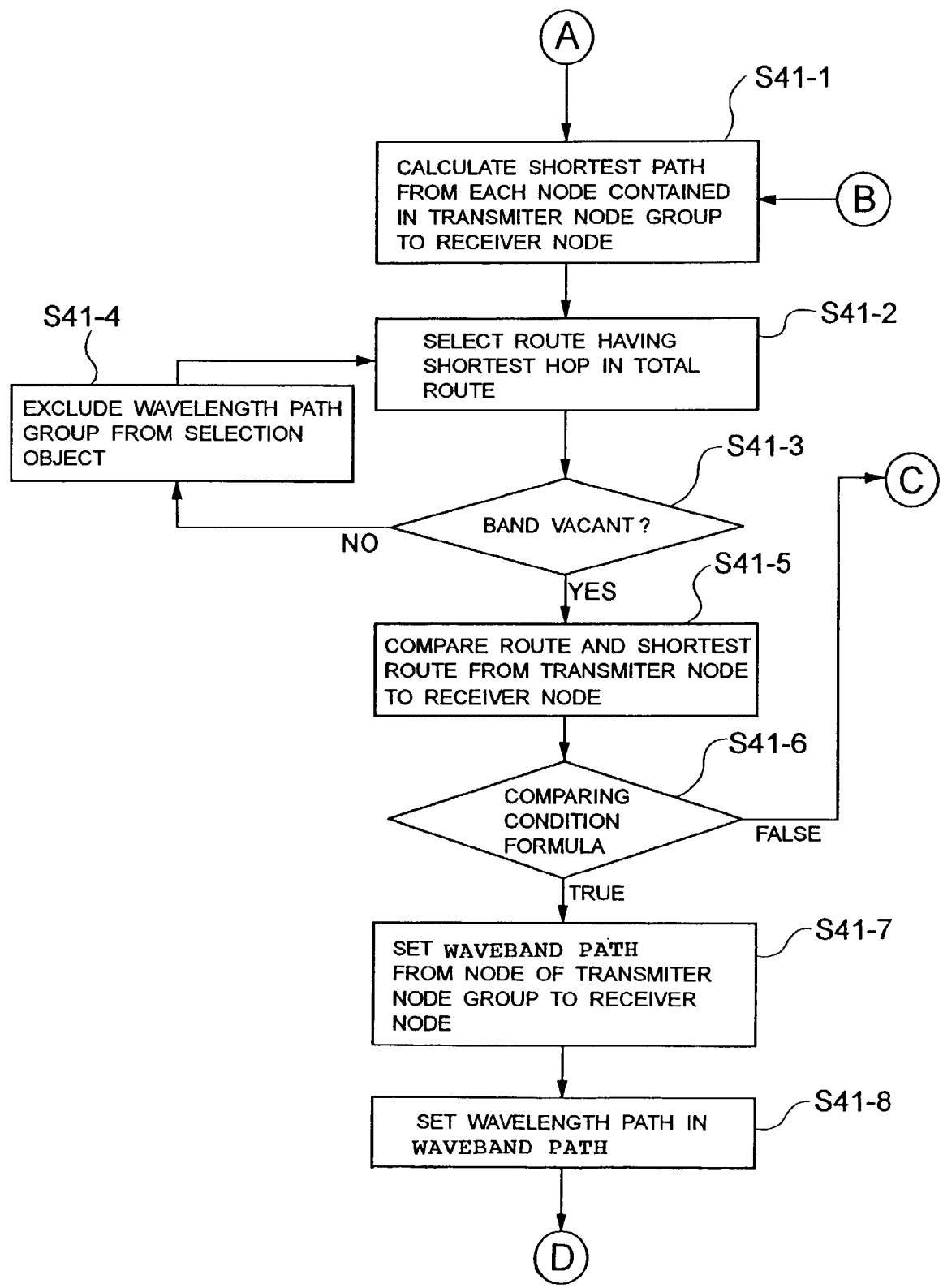
FIG. 7 is a flowchart for setting hierarchized path in the third embodiment of the present invention.
Figure 8:
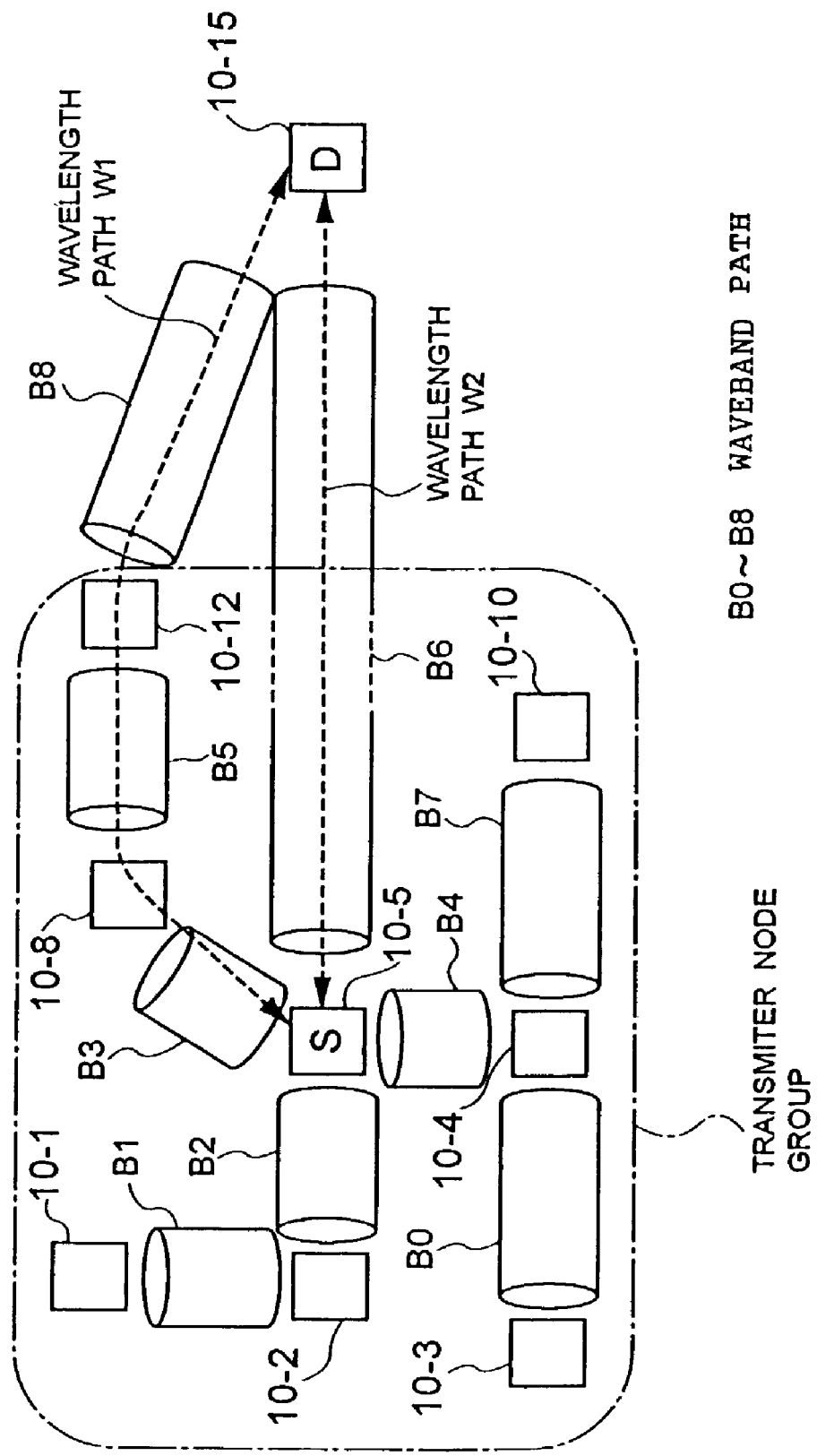
FIG. 8 is a block diagram showing a condition of path set in the third embodiment of the present invention.

FIGS. 7 and 8 are flowchart and block diagram showing the third embodiment of the present invention. The third embodiment of the present invention is a system for setting the wavelength path via the node contained in the transmitter node group by setting the waveband path between the transmiter node group consisted of nodes reachable from the transmitter node through the waveband path and the receiver node.

At first, each node forms the group consisted of nodes reachable from the own node via the waveband paths. For example, as shown by the area encircled by one-dotted line in FIG. 8, when the waveband path is set from the node 10-5, the group information stored in the database 22 of the node 10-5 is information relating to the nodes 10-1, 10-2, 10-3, 10-4, 10-8, 10-10 and 10-12. The reachable node information is obtained by exchanging the reachable information described in the second embodiment.

Next, operation will be discussed for the case where the path setting demand for setting demand from the node 10-5 to the node 10-15 occurs using FIG. 7 with reference to FIG. 8. In FIG. 7, up to the processes of A and B, processes are performed through the same process as those in the first embodiment of the flowchart of FIG. 4. After the process or A or B, the shortest route from the each node (10-1, 10-2, 10-3, 10-4, 10-8, 10-10, 10-12) contained in the transmitter node group to the receiver node 10-15 is calculated using only links having vacant band by the CSPF algorithm (S41-1).

Then, a route which has minimum sum of hop number of the route derived at step S41-1 and routes to the nodes (10-1, 10-2, 10-3, 10-4, 10-8, 10-10, 10-12) in the group, namely a route of minimum hop number of the route from the transmiter node to the receiver node via the nodes in the transmitter node group, is selected (S41-2). When no vacant band for setting the wavelength path is present in the waveband path of the route (S41-3), the processes of S41-2 are repeated eliminating the route having no vacant band for setting the wavelength path from selection object.

At step S41-3, if the vacant band is present, the route is compared with the shortest route from the transmitter node to the receiver node. If the comparing condition formula is "false" (S41-6), a process of C is performed. If the comparing condition formula is "true", the waveband path B8 from the node 10-12 of the transmitter node group to the receiver node is set (S41-7), and then the wavelength path W1 is set from the transmiter node to the receiver node via the waveband paths B3, B5 and B8. Subsequently, the process is moved to a process D.

By repeating the foregoing path setting method between the nodes of the transmitter node and the receiver node to set, the wavelength path can be efficiently aggregated without dividing the network into the sub-net works. Thus, bands in the waveband path can be used effectively. On the other hand, in the shown embodiment, using the setting information of the waveband path set from the transmitter node and the wavelength path group set from the receiver node, the transmitter node sets the route. Therefore, more optimal route is selected in comparison with other embodiments.

Figure 9:
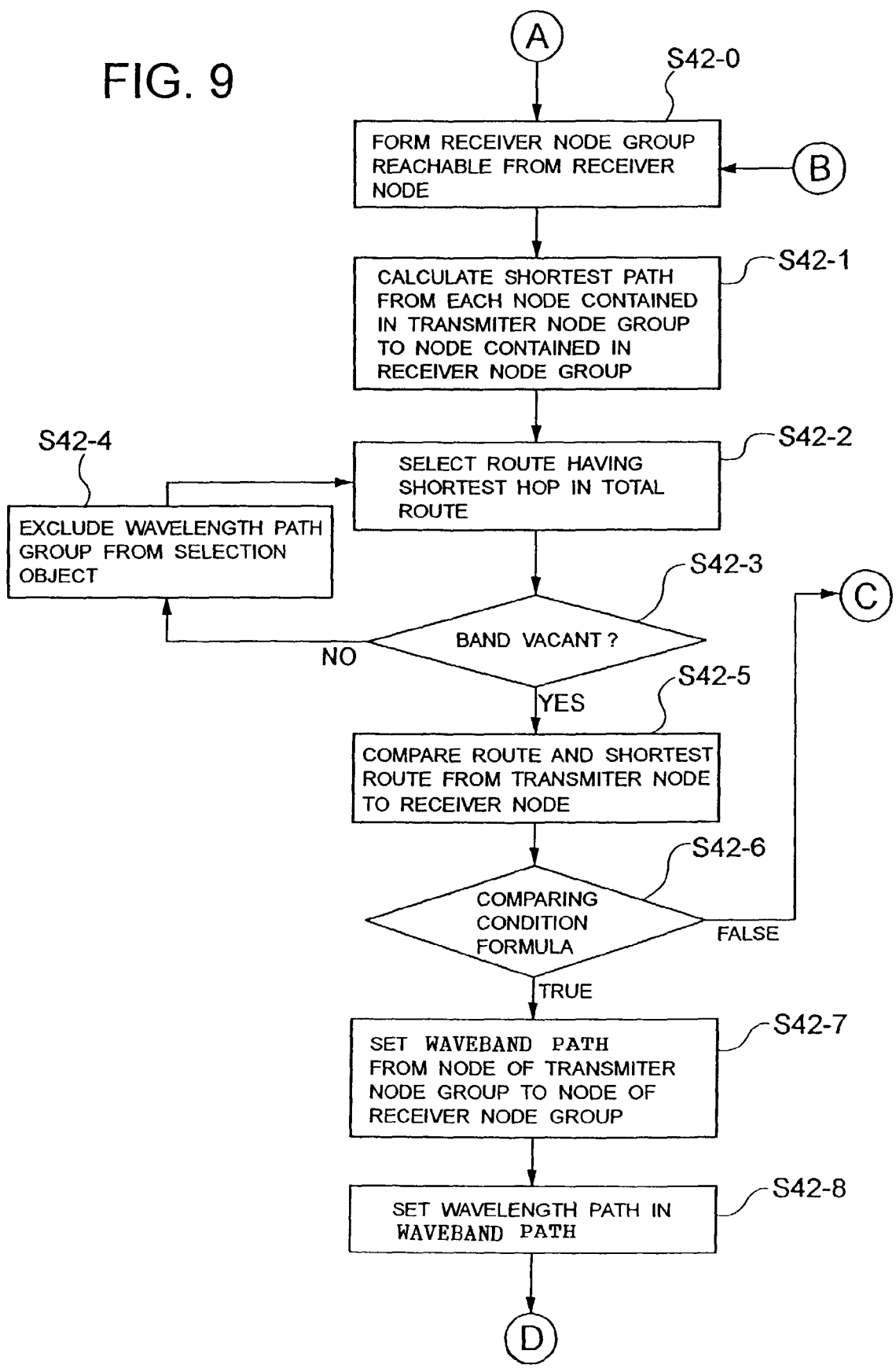
FIG. 9 is a flowchart for setting hierarchized path in the fourth embodiment of the present invention.
Figure 10:
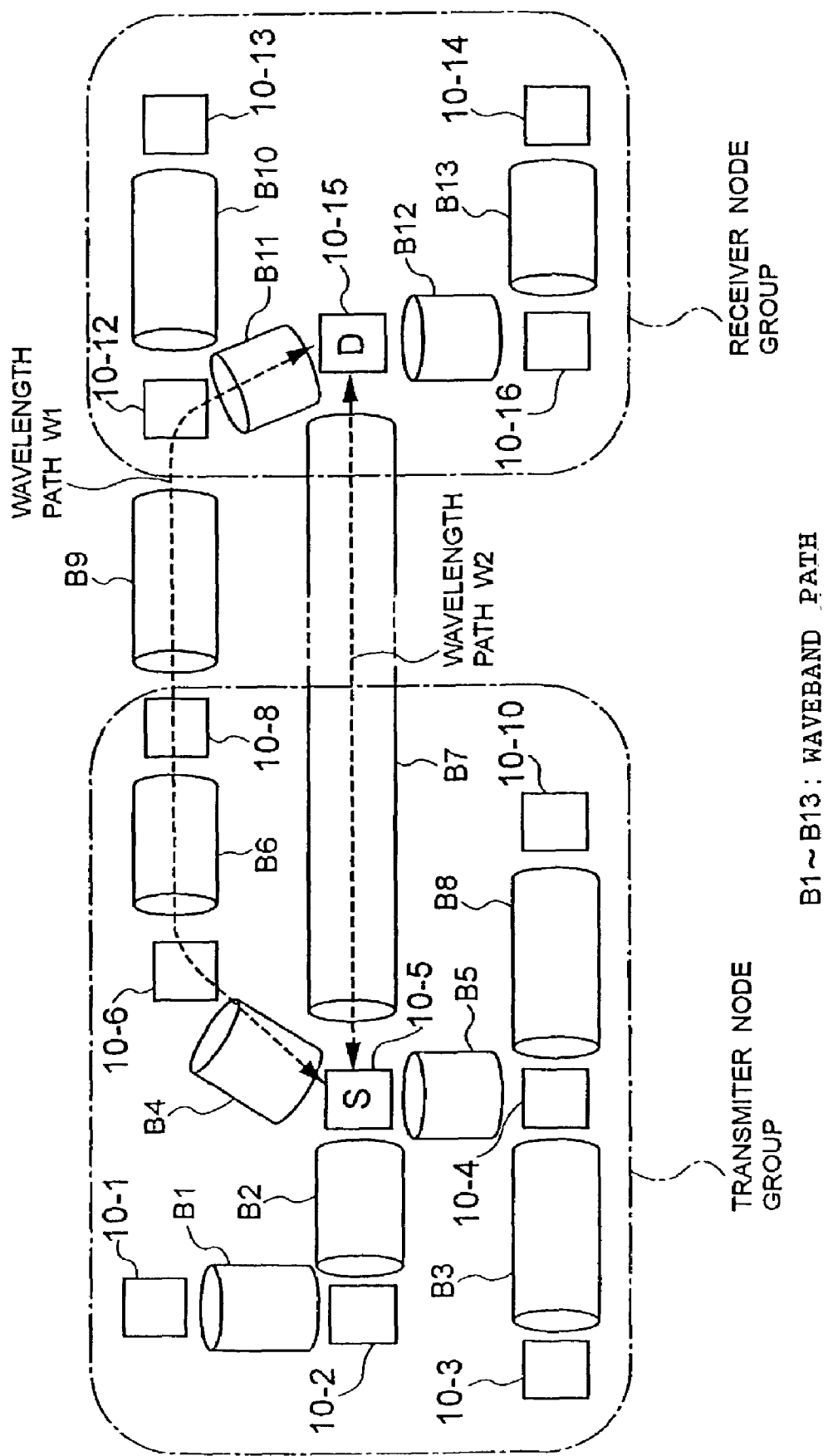
FIG. 10 is a block diagram showing a condition of path set in the fourth embodiment of the present invention.

FIGS. 9 and 10 are flowchart and the block diagram showing the fourth embodiment of the present invention. The fourth embodiment is a system for setting the wavelength path via the node in the transmitter node group and the node in the receiver node group by setting the waveband path between the transmitter node group consisted of the nodes reachable from the transmitter node and the receiver node group consisted of the nodes reachable from the receiver node.

Different from the third embodiment, in the fourth embodiment, specifying node included in the receiver node group, the transmitter node is required to know the setting information of the waveband path of the overall network. Exchanging of the waveband path setting information may be performed using the system similar to exchanging of the reachable node information discussed in connection with the second embodiment of the present invention. A point where the exchanging system of the waveband path setting information of the overall network is different from the exchanging system of the reachable node information of the second embodiment, is that the path setting information is not distributed to the node to which the waveband path is set, but is distributed to all adjacent nodes connected by the optical fiber. By this, each node can obtain the setting information of the waveband paths of the overall network. This information may be updated regularly or at every occurrence of setting of new path using the routing function.

At first, each node forms a group consisted of the nodes reachable from the own node via the waveband path. For example, when the waveband paths from each of own node is set in a condition shown in FIG. 10 except for the waveband paths B7 and B9, the group of the node 10-5 is consisted of nodes 10-1, 10-2, 10-3, 10-4, 10-6, 10-8 and 10-10 and the group of the node 10-15 is consisted of the nodes 10-12, 10-13, 10-14 and 10-16. This information is stored in the database 22 of each node. The reachable node information is obtained by the method discussed in connection with the second embodiment set forth above. Namely, the reachable node information can be obtained by the method sequentially sending the reachable node information to the nodes connected to the own node through the links.

Next, discussion will be given for operation in the case where a path setting demand for setting path from the node 10-5 to the node 10-15 occurs, using FIG. 9 with reference to FIG. 10. In FIG. 9, up to the processes of A and B, processes are performed through the same process as those in the first embodiment of the flowchart of FIG. 4. After the process or A or B, the transmiter node forms the receiver node group on the basis of the waveband path information of the overall network of the database 22 (step S42-0). Next, calculation of the shortest routes from each node (10-1, 10-2, 10-3, 10-4, 10-6, 10-8, 10-10) contained in the transmiter node group to each node (10-12, 10-13, 10-14, 10-16) contained in the receiver node group is performed using only links having vacant bands by CSPF algorithm (S42-1).

Next, selection is made for a route, in which the sum of the calculated route, the route to the node in the transmiter node group and the route to the node in the receiver node group, is minimum (here, the route through the nodes 10-16, 10-8 and 10-12) (S42-2). When no vacant band for setting the wavelength is not available in the waveband path of this route (S42-3), the process of step 42-2 is repeated with excluding such route (having no vacant band) from selection object (S42-4). At step S42-3, if the vacant band is available, the route and the shortest route from the transmiter node to the receiver node are compared (S42-5). If the comparing condition formula is "false" (S42-6), a process of C is performed. If the comparing condition formula is "true", the waveband path B9 from the node of the transmiter node group to the node of the receiver node is set (S42-7) and then the wavelength path W1 is set from the transmiter node to the receiver node via the waveband paths (B4, B6, B9 and B11). Subsequently, the process is moved to a process D.

By repeating the foregoing path setting method between the transmiter node and the receiver node for setting the path, the wavelength path can be efficiently aggregated without dividing the network into the sub-net works. Thus, bands in the waveband path can be used effectively.

It should be noted that the shown embodiment is applicable when the waveband path from the transmiter node to the receiver node group consisted of the reachable nodes is set and the wavelength path is set via the waveband path.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

For instance, while the foregoing embodiments have been discussed in connection with the network consisted of the waveband paths and the wavelength paths, the invention is likewise applicable for the networks consisted of other higher order paths and lower order paths. Also, the present invention is applicable for the network having paths having three or more different granularities. Namely, the present invention is applicable for any networks having hirarchized paths depending upon large and small of bands.

Figure 11:
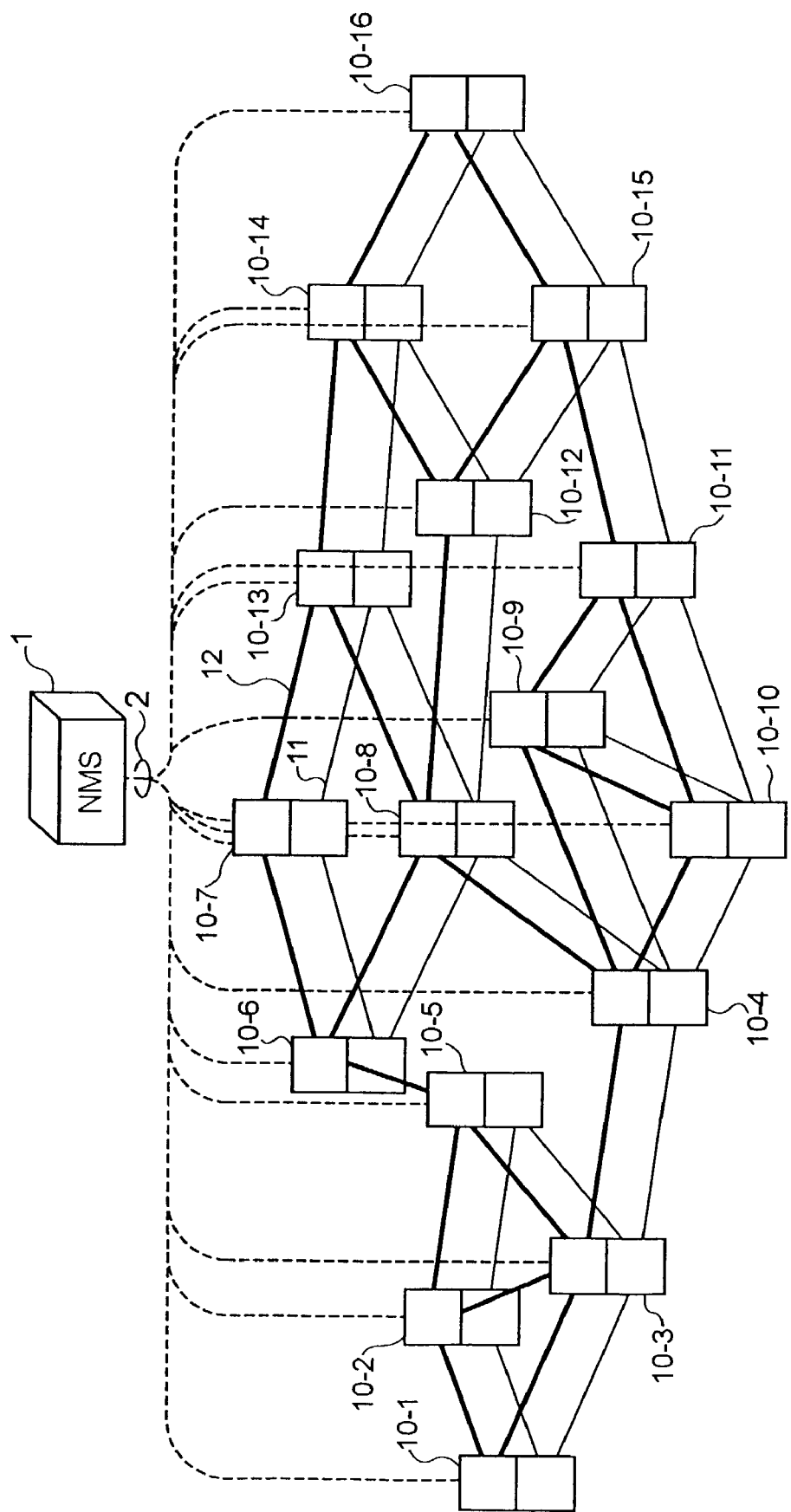
FIG. 11 is a block diagram showing a construction of the network concentrically controlled by an NMS.
Figure 12:
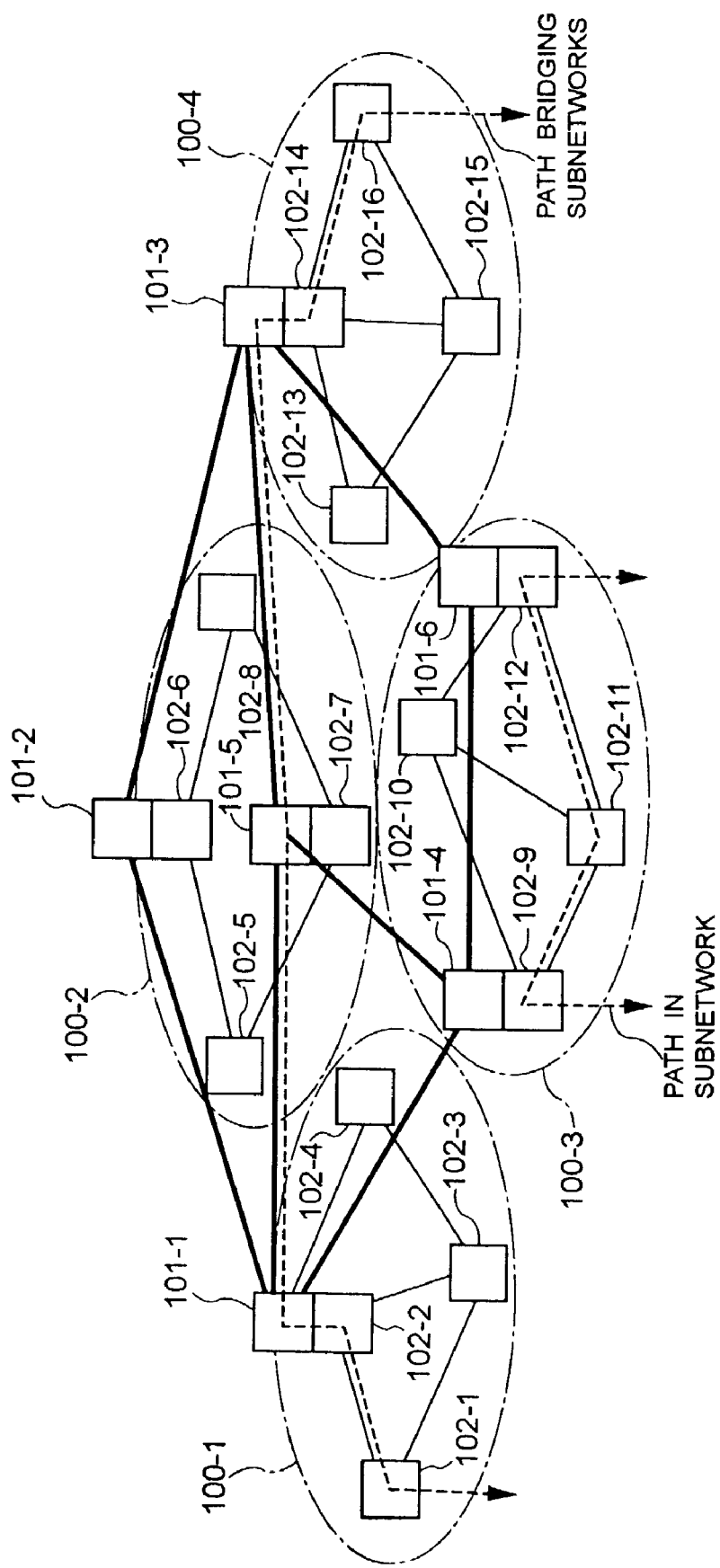
FIG. 12 is a block diagram showing a construction of the network divided into sub-networks.

On the other hand, in the foregoing embodiments, discussion has been given in connection with the distributed control system setting the control channels between the nodes by the nodes receiving the path setting demand. However, these system is applicable for concentrated control system setting the nodes via a control link 2 by a network management system (NMS) 1 shown in FIG. 11. In case of the concentrated control system, each node is not required to exchange the setting information with the other nodes and the path setting information is transmitted to the network management system 1 via the control link 2. Accordingly, since the network management system can obtain the path setting information of the overall path, the path can be set in the similar procedure as the foregoing embodiment when path setting demand is present.

Furthermore, while the foregoing embodiment is not limited to the network, in which the wavelength group links and the wavelength links are formed with different fibers as shown in FIG. 1, the present invention is applicable even in the network setting the waveband paths and the wavelength paths using different bands in the same fibers. On the other hand, each operations of FIGS. 4, 7 and 9 are preliminarily stored in the storage medium as programs to load on the computer installed in the node device for execution.

With the invention set forth above, since the lower order paths can be multiplexed in the higher order paths efficiently, the network resource can be used effectively even in the network, in which large number of lower order path setting demands can occur. On the other hand, according to the present invention, since the higher order path can be established by aggregating lower order paths at the arbitrary node. Therefore, it is not required to divide the network into sub-networks. By this, even when failure is caused in the node setting the higher order path, significant influence on the network can be avoided.

What is claimed is:

1. A communication network comprising:
   a plurality of nodes capable to perform switching process and demultiplexing process not only for predetermined order paths in a predetermined hierarchical level (hereinafter referred to lower order path) among hierarchized paths but also for higher order paths in a hierarchical level higher than said predetermined hierarchical level;
   a plurality of links connecting these nodes; and path setting control means responsive to a new path setting demand for setting the lower order path, for setting the lower order path in said higher order path when a single higher order path is set from a predetermined transmitter node group, in which a transmitter node of the lower order path belongs, to a predetermined receiver node group including a receiver node.

2. A communication network as set forth in claim 1, wherein said lower order path is set in said higher order path in a shortest route among higher order paths having vacancy when said lower order path is set in said higher order path.

3. A communication network as set forth in claim 1, wherein said lower order path is set in one of said higher order paths satisfying a predetermined comparing condition formula as compared with a physically shortest route from said transmiter node to said receiver node among higher order paths having vacancy when said lower order path is set in said higher order path.

4. A communication network as set forth in claim 1, wherein said path setting control means newly sets said higher order path from said transmiter node to said receiver node when said single higher order path is not set from said transmiter node group to said receiver node group, and sets said lower order path in said newly set higher order path.

5. A communication network as set forth in claim 4, wherein said path setting control means sets said higher order path of the shortest route upon setting said higher order path.

6. A communication network as set forth in claim 1, wherein said path setting control means has a database storing path setting information relating to said higher order path being already set by each node belonging said transmiter node group and performs path setting control with reference to the information of said database.

7. A communication network as set forth in claim 1, wherein said path setting control means retrieves route for the nodes belonging in said transmiter node group for reaching said receiver node group via a plurality of higher order paths when said single higher order path is not set from said transmiter node group to said receiver node group, and sets said lower order paths from said transmiter node to said receiver node via a plurality of higher order paths forming retrieved routes.

8. A communication network as set forth in claim 7, wherein said lower order path is set in said higher order path of the shortest route among said retrieved route having vacancy upon setting said lower order path.

9. A communication network as set forth in claim 7, wherein said path setting control means has a database storing path setting information relating to said higher order path already set by each node belonging said transmiter node group and reachable path information indicative of routes through which each node is reachable to said receiver node group via said plurality of higher order path, and performs path setting control with reference to the information of said database.

10. A communication network as set forth in claim 1, wherein said transmiter node group and said receiver node group are groups containing said nodes having predetermined value or less than the value of hop number from said transmiter node group and said receiver node group.

11. A communication network as set forth in claim 1, wherein said control operation of said path setting control means is executed in said transmiter node.

12. A communication network as set forth in claim 1, wherein said control operation of said path setting control step is executed in a network management system.

13. A path setting method in a communication network comprising:
a plurality of nodes capable to perform switching process and demultiplexing process not only for predetermined order paths in a predetermined hierarchical level (hereinafter referred to lower order path) among hierarchized paths but also for higher order paths in a hierarchical level higher than said predetermined hierarchical level; and
a plurality of links connecting these nodes;
said path setting method comprising:
path setting control step, responsive to a new path setting demand for setting the lower order path, of setting the lower order path in said higher order path when a single higher order path is set from a predetermined transmiter node group, in which a transmitter node of the lower order path belongs, to a predetermined receiver node group including a receiver node; and
path setting information storing step for storing information relating to the lower order path in each of the plurality of nodes.

14. A path setting method as set forth in claim 13, wherein said lower order path is set in said higher order path in a shortest route among higher order paths having vacancy when said lower order path is set in said higher order path.

15. A path setting method as set forth in claim 13, wherein in said path setting control step said higher order path from said transmiter node to said receiver node is newly set when said single higher order path is not set from said transmiter node group to said receiver node group, and said lower order path is set in said newly set higher order path.

16. A path setting method as set forth in claim 15, wherein in said path setting control step, said higher order path of the shortest route is set upon setting said higher order path.

17. A path setting method as set forth in claim 13, wherein in said path setting control step, a database is provided for storing path setting information relating to said higher order path being already set by each node belonging said transmiter node group and path setting control is performed with reference to the information of said database.

18. A path setting method as set forth in claim 13, wherein in said path setting control step, retrieval is performed for the route for the nodes belonging in said transmiter node group for reaching said receiver node group via a plurality of higher order paths when said single higher order path is not set from said transmiter node group to said receiver node group, and said lower order paths is set from said transmiter node to said receiver node via a plurality of higher order paths forming a retrieved route.

19. A path setting method as set forth in claim 18, wherein said lower order path is set in said higher order path of the shortest route among said retrieved route having vacancy upon setting said lower order path.

20. A path setting method as set forth in claim 18, wherein in said path setting control step, a database is provided for storing path setting information relating to said higher order path already set by each node belonging said transmiter node group and reachable path information indicative of routes through which each node is reachable to said receiver node group via said plurality of higher order path, and path setting control is performed with reference to the information of said database.

21. A path setting method as set forth in claim 13, wherein said transmiter node group and said receiver node group are groups containing said nodes having predetermined value or less than the value of hop number from said transmiter node group and said receiver node group.

22. A path setting method as set forth in claim 13, wherein said control operation of said path setting control step is executed in said transmiter node.

23. A path setting method as set forth in claim 13, wherein said control operation of said path setting control step is executed in a network management system.

24. A node comprising:
a switch for switching not only predetermined order paths in a predetermined hierarchical level (hereinafter referred to lower order path) among hierarchized paths but also higher order paths in a hierarchical level higher than said predetermined hierarchical level;
multiplexing means for multiplexing a plurality of said lower order paths in said higher order path;
demultiplexing means for demultiplexing said higher order path into said lower order paths; and
path setting control means responsive to a new path setting demand for setting the lower order path containing own node as a transmiter node, for setting the lower order path in the higher order path when a single higher order path is set from a predetermined transmiter node group, in which a transmiter node of the lower order path belongs, to a predetermined receiver node group including a receiver node.

25. A node as set forth in claim 24, wherein said lower order path is set in said higher order path in a shortest route among higher order paths having vacancy when said lower order path is set in said higher order path.

26. A node as set forth in claim 24, wherein said lower order path is set in one of said higher order paths satisfying a predetermined comparing condition formula as compared with a physically shortest route from said transmiter node to said receiver node among higher order paths having vacancy when said lower order path is set in said higher order path.

27. A node as set forth in claim 24, wherein said path setting control means newly sets said higher order path from said transmiter node to said receiver node when said single higher order path is not set from said transmiter node group to said receiver node group, and sets said lower order path in said newly set higher order path.

28. A node as set forth in claim 27, wherein said path setting control means sets said higher order path of the shortest route upon setting said higher order path.

29. A node as set forth in claim 24, wherein said path setting control means has a database storing path setting information relating to said higher order path being already set by each node belonging said transmiter node group and performs path setting control with reference to the information of said database.

30. A node as set forth in claim 24, wherein said path setting control means retrieves route for the nodes belonging in said transmiter node group for reaching said receiver node group via a plurality of higher order paths when said single higher order path is not set from said transmiter node group to said receiver node group and sets said lower order paths from said transmiter node to said receiver node via a plurality of higher order paths forming a retrieved route.

31. A node as set forth in claim 30, wherein said lower order path is set in said higher order path of the shortest route among said retrieved route having vacancy upon setting said lower order path.

32. A node as set forth in claim 30, wherein said path setting control means has a database storing path setting information relating to said higher order path already set by each node belonging said transmiter node group and reachable path information indicative of routes through which each node is reachable to said receiver node group via said plurality of higher order path, and performs path setting control with reference to the information of said database.

33. A node as set forth in claim 24, wherein said transmiter node group and said receiver node group are groups containing said nodes having predetermined value or less than the value of hop number from said transmiter node group and said receiver node group.

34. A node as set forth in claim 33, wherein said path setting control means has a database storing reachable path information indicative of a route through which each node belonging in said transmiter node group is reachable to said receiver node group or said receiver node via the higher order path, and performs path setting control with reference to the information in said database.

35. A network management system in a communication network including a plurality of nodes capable to perform switching process and demultiplexing process not only for predetermined order paths in a predetermined hierarchical level (hereinafter referred to lower order path) among hierarchized paths but also for higher order paths in a hierarchical level higher than said predetermined hierarchical level;
said network management system comprising:
path setting control means responsive to a new path setting demand for setting the lower order path, for setting the lower order path in said higher order path when a single higher order path is set from a predetermined transmiter node group, in which a transmiter node of the lower order path belongs, to a predetermined receiver node group including a receiver node; and
linking means to connect the plurality of nodes.

36. A network management system as set forth in claim 35, wherein said lower order path is set in said higher order path in a shortest route among higher order paths having vacancy when said lower order path is set in said higher order path.

37. A network management system as set forth in claim 35, wherein said lower order path is set in one of said higher order paths satisfying a predetermined comparing condition formula as compared with a physically shortest route from said transmiter node to said receiver node among higher order paths having vacancy when said lower order path is set in said higher order path.

38. A network management system as set forth in claim 35, wherein said path setting control means newly sets said higher order path from said transmiter node to said receiver node when said single higher order path is not set from said transmiter node group to said receiver node group, and sets said lower order path in said newly set higher order path.

39. A network management system as set forth in claim 38, wherein said path setting control means sets said higher order path of the shortest route upon setting said higher order path.

40. A network management system as set forth in claim 35, wherein said path setting control means has a database storing path setting information relating to said higher order path being already set by each node belonging said transmiter node group and performs path setting control with reference to the information of said database.

41. A network management system as set forth in claim 35, wherein said path setting control means retrieves route for the nodes belonging in said transmiter node group for reaching said receiver node group via a plurality of higher order paths when said single higher order path is not set from said transmiter node group to said receiver node group and sets said lower order paths from said transmiter node to said receiver node via a plurality of higher order paths forming a retrieved route.

42. A network management system as set forth in claim 41, wherein said lower order path is set in said higher order path of the shortest route among said retrieved route having vacancy upon setting said lower order path.

43. A network management system as set forth in claim 41, wherein said path setting control means has a database storing path setting information relating to said higher order path already set by each node belonging said transmiter node group and reachable path information indicative of routes through which each node is reachable to said receiver node group via said plurality of higher order path, and performs path setting control with reference to the information of said database.

44. A network management system as set forth in claim 35, wherein said transmiter node group and said receiver node group are groups containing said nodes having predetermined value or less than the value of hop number from said transmiter node group and said receiver node group.

45. A storage medium storing a program to be executed by a computer for path setting control in a communication network comprising:
    a plurality of nodes capable to perform switching process and demultiplexing process not only for predetermined order paths in a predetermined hierarchical level (hereinafter referred to lower order path) among hierarchized paths but also for higher order paths in a hierarchical level higher than said predetermined hierarchical level; and
    a plurality of links connecting these nodes;
    said program comprising:
    path setting control step, responsive to a new path setting demand for setting the lower order path, of setting the lower order path in said higher order path when a single higher order path is set from a predetermined transmiter node group, in which a transmiter node of the lower order path belongs, to a predetermined receiver node group including a receiver node;
    wherein path setting information relating to the lower order path is stored in each of the plurality of nodes.

46. A storage medium as set forth in claim 45, wherein in said path setting control step said higher order path from said transmiter node to said receiver node is newly set when said single higher order path is not set from said transmiter node group to said receiver node group, and said lower order path is set in said newly set higher order path.

47. A storage medium as set forth in claim 45, wherein in said path setting control step, retrieval is performed for the route for the nodes belonging in said transmiter node group for reaching said receiver node group via a plurality of higher order paths when said single higher order path is established from said transmiter node group to said receiver node group and said lower order paths is not set from said transmiter node to said receiver node via a plurality of higher order paths forming a retrieved route.

* * * * *